US008308538B2

(12) United States Patent
Naicker

(10) Patent No.: US 8,308,538 B2
(45) Date of Patent: Nov. 13, 2012

(54) METHODS AND DEVICES FOR CARD GAMES WITH CARD REPLACEMENT

(75) Inventor: Theo Naicker, Durban (ZA)

(73) Assignee: Cork Group Trading Ltd., Tortola (VG)

( * ) Notice: Subject to any disclaimer, the term of this patent is extended or adjusted under 35 U.S.C. 154(b) by 468 days.

(21) Appl. No.: 12/580,615

(22) Filed: Oct. 16, 2009

(65) Prior Publication Data

US 2011/0092262 A1 Apr. 21, 2011

(51) Int. Cl.
*A63F 13/12* (2006.01)
*A63F 1/00* (2006.01)

(52) U.S. Cl. ................ 463/11; 463/12; 463/13; 463/25; 463/42

(58) Field of Classification Search .................... 463/11, 463/12, 13, 25, 42; 273/292
See application file for complete search history.

(56) References Cited

U.S. PATENT DOCUMENTS

| | | | | |
|---|---|---|---|---|
| 5,704,835 | A | 1/1998 | Dietz, II | |
| 6,416,407 | B1 | 7/2002 | Carrico et al. | |
| 7,393,278 | B2 | 7/2008 | Gerson et al. | |
| 2005/0026665 | A1 | 2/2005 | Gerrard et al. | 463/13 |
| 2005/0059451 | A1 | 3/2005 | Shackleford | |
| 2005/0209001 | A1 | 9/2005 | Moshal | |
| 2006/0149561 | A1 | 7/2006 | Govender | |
| 2006/0252512 | A1 * | 11/2006 | Walker et al. | 463/25 |
| 2007/0155460 | A1 | 7/2007 | Burnside et al. | |
| 2007/0262528 | A1 | 11/2007 | McKee | 273/293 |

OTHER PUBLICATIONS

"Two Plus Two Poker Forums—Poll: Should anonymity be allowed in Rush Poker," p. 1 of 2, downloaded from the World Wide Web at http://forumserver.twoplustwo.com/28/internet-poker/poll-shold-anonymity-allowed-rush-poker-694741/, on Jan. 29, 2010.
"Two Plus Two Poker Forums—Poll: Should anonymity be allowed in Rush Poker?," p. 2 of 2, downloaded from the World Wide Web at http://forumserver.twoplustwo.com/28/internet-poker/poll-shold-anonymity-allowed-rush-poker-694741/, on Jan. 29, 2010.
David Benefield : Poker Blog, "Multiaccounting," Sep. 12, 2008, CardRunners Blog Network, downloaded from the World Wide Web at http://blogs.cardrunners.com/davidb/Multiaccounting.

* cited by examiner

*Primary Examiner* — Damon Pierce
(74) *Attorney, Agent, or Firm* — McDonnell Boehnen Hulbert & Berghoff LLP

(57) ABSTRACT

A player of a card game, such as poker, is presented with opportunities to replace one or more of the cards in his or her hand. The first such replacement may be free, but the player may incur a cost for each subsequent replacement. This cost may be based on how much the player is expected to benefit from the replacement. Facilitating these subsequent replacements may allow the player to improve a poor hand, thus enhancing the player's excitement of playing the card game.

49 Claims, 8 Drawing Sheets

INITIAL HAND 112

HOLD HOLD REPLACE REPLACE REPLACE

HAND AFTER
REPLACEMENT 114

METHODS AND DEVICES FOR CARD GAMES WITH CARD REPLACEMENT

CROSS-REFERENCE TO RELATED APPLICATIONS

This application is entitled to the benefit of the co-pending patent application entitled "Methods and Devices for Multi-State Card Games with Card Replacement," with listed inventor Theo Naicker, filed on the same date as this application, and hereby incorporated by reference in its entirety.

BACKGROUND

In various types of card games, such as but not limited to poker, instead of competing against other participants, a player may compete against a house. The house may be any type of game provider, such as a brick-and-mortar or online casino. The player's goal may be to achieve one of several possible winning hands through a combination of luck and strategy.

The house that provides a card game usually expects a marginal profit on each hand played. In order to achieve this profit, the house may seek to differentiate itself from other game providers by offering new card games, as well as new variations of well-known card games. Players may be relatively indifferent to standard versions of well-known card games, and therefore may find new variations of these card games fresh and exciting in comparison. Exciting card games also tend to encourage repeat play and return visits to the game provider. Thus, house profit is likely to increase when the house provides new variations of known card games.

SUMMARY

The methods and devices disclosed herein provide enhancements to card games by giving players an opportunity to exchange their cards at various stages of a card game. These exchanges may result in the player's hand being improved. As a result, players may benefit from finding the card game more enjoyable and therefore may engage in additional gameplay. Some of these exchanges may be associated with a cost to the player. Therefore, the house may also benefit from increased popularity, increased gameplay, more players, and/or a higher profit margin.

In one embodiment, a player engages in a card game such as poker. The player's goal may be to form one of several predetermined winning hands of cards. Each winning hand may be associated with a specific return, or payout, to the player. For instance, a poker hand of three of a kind may return 3-to-1 (that is, the player receives three times his or her wager), while a full house may return 10-to-1. To facilitate the player's wagering, the player may be associated with an account that is either held by the house or by a third party.

Accordingly, the player may be dealt an initial hand of cards from a deck, and may be offered the opportunity to perform a free card replacement cycle of one or more of these cards. If the player chooses to perform the first card replacement cycle, the player may select one or more cards from his or her hand to be replaced, and hold the remaining cards. The selected cards may be discarded and replaced with an equal number of cards drawn from the deck and added to the player's hand. After this optional first replacement, the player may be shown, told, or otherwise determine a first return on his or her hand of cards.

If the player is unsatisfied with this first return, the player may opt to select one or more cards for a second card replacement cycle. However, the player may incur a cost for performing this second cycle. In particular, the cost may be based on the difference between the first return and the expected second return associated with replacing the cards the player has selected for replacement. For instance, based on the cards the player holds, the cards the player selects for replacement, and the overall state of the game, the expected second return can be determined before the second replacement cycle actually takes place.

The cost of the second replacement cycle may be provided to the player, and the player may decide whether to perform the second replacement cycle. If the player decides to perform the second replacement cycle and incur the associated cost, the player's selected cards may be discarded and replaced with new cards drawn from the deck, and the player's account may be debited by the cost. At this point, the game may end with the player being awarded the actual return of the player's hand. Alternatively, the player may be offered one or more additional opportunities to perform additional replacement cycles.

These and other aspects and advantages will become apparent to those of ordinary skill in the art by reading the following detailed description, with reference where appropriate to the accompanying drawings. Further, it should be understood that the foregoing overview is merely for purposes of illustration and is not intended to limit the scope of the invention as claimed.

DETAILED DESCRIPTION

Figure 1:
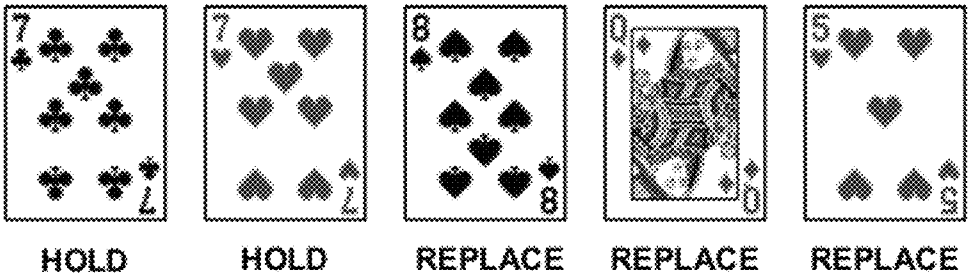
FIG. 1 illustrates a first replacement of selected cards in a hand of poker, in accordance with an example embodiment.
Figure 1:
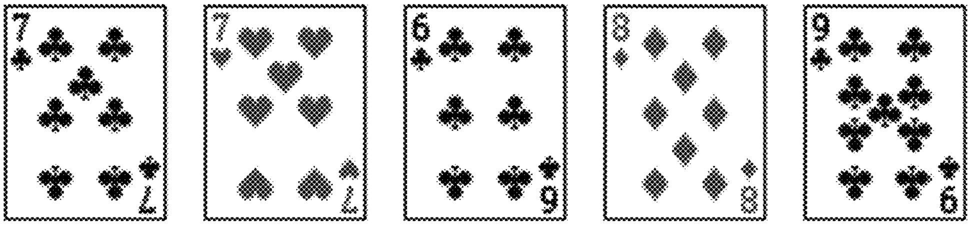

Card games that provide players with opportunities to improve their hands are presented. Preferably, these opportunities are associated with costs to be incurred by the player, should the player choose to take advantage of the opportunity and replace one or more chosen cards. The costs may be dynamically determined based on the player's expected return once the chosen cards are replaced. The card games disclosed here may be played by humans, either as a table game, or via a computer medium. Alternatively, the card games may be played by a human against a computer opponent, or by two computers.

Herein the term "card game" preferably refers to a single instance or single play of a game such as poker. Thus, a card game may involve a card supply, such as a deck, being shuffled or otherwise randomized, the player engaging in play of the card game, and the card game coming to some form of conclusion. Then the card supply may be re-shuffled prior to the next card game. Alternatively, the player may engage in multiple plays of the card game, each with a respective conclusion, before the card supply is reshuffled.

I. Game Description

The embodiments herein are disclosed in the context of card games that preferably take place between a player and a house. These card games may use a standard playing card deck of 52 cards, divided into four suits. These four suits may be, for example, clubs, diamonds, hearts, and spades, or some other type of suit may be used. Therefore, each suit may contain 13 cards, ten of which are preferably labeled with ranks from 1 (ace) to 10, and three of which are preferably face cards with ranks of jack, queen, and king. Alternatively, non-standard playing cards may be used as well without departing from the scope of the invention. Additionally, multiple decks of cards may be used as the supply of any cards drawn or dealt.

Typically, these card games allow a player to place a wager at the beginning of each game. Then, the player may engage in the card game in an attempt to achieve a winning hand. The card game may have one or more possible winning hands, and each winning hand is preferably a specific combination of cards that is associated with a return. Preferably, the more difficult it is for the player to achieve the winning hand, the greater the return. Each return may be calculated based at least in part on the player's wager. For instance, the return for a given winning hand may be a particular multiple of the player's wager. If the player does not achieve a winning hand by the end of the card game, the player may lose his or her wager.

In order to facilitate convenient wagering, the player may establish an account for maintaining the player's credit balance. These credits may be or may represent a denomination of money, a representation of money, or items of value that can be exchanged for money. Alternatively, the credits may represent play money and have no actual value, thus allowing players to enjoy the card game without risking actual financial loss. The account may be managed either by the house or a third party, and from time to time the player may load the account with credits via cash payment, credit card, electronic funds transfer, or some other means.

While the embodiments herein may be used with any type of card game played against a house, the embodiments are described in the context of the popular game of poker. It should be understood that poker other types of card games may be played according to a wide variety of rules. For instance, these card games may be played according to house rules of the game provider, or local or regional jurisdictional rules that vary the type of cards used, number of cards per hand, winning hands, returns for each winning hand, or other aspects of gameplay. Accordingly, the embodiments herein may be applied to these alternate rules as well.

Poker typically involves a player initially being dealt five cards from a standard 52-card deck. Alternatively, the player may initially be dealt more or fewer cards from a standard or non-standard deck. The goal of a player in poker may be to achieve a winning hand with a satisfactory return.

TABLE 1

Example winning hands in poker.

| Wining Hand | Return | Description |
|---|---|---|
| Royal Flush | 250-to-1 | A straight flush consisting of a sequence of cards from ten through ace of the same suit. |
| Straight Flush | 50-to-1 | Five cards in sequence and of the same suit. |
| Four of a Kind | 20-to-1 | Four cards of the same rank. |
| Full House | 10-to-1 | Three cards of a first rank and two cards of a second rank. |
| Flush | 6-to-1 | Five cards of the same suit. |
| Straight | 4-to-1 | Five cards of any suit in sequence. |
| Three of a kind | 3-to-1 | Three cards of the same rank. |
| Two Pair | 2-to-1 | Two cards of a first rank and two cards of a second rank. |
| One Pair | 1-to-1 | Two cards of the same rank. |

Table 1 provides an example listing of winning poker hands in the form of a pay table. Each winning hand is associated with a return. Generally speaking, the more difficult a winning hand is to achieve, the higher the return. Thus, a royal flush, the most difficult winning hand to achieve in Table 1, returns 250 credits for each credit the player wagers. Conversely, one pair, a relatively easy-to-achieve winning hand, returns only one credit for each credit wagered (in other words, the player breaks even when achieving one pair). When evaluating a player's hand against a table, preferably only the best possible winning hand return is awarded to the player. Thus, a hand with three of a kind will only be awarded the return associated with three of a kind rather than the return associated with two of a kind.

It should be understood that the winning hands and returns listed in Table 1 only for purposes of example. Accordingly, additional winning hands as well as different returns, could be used. Furthermore, some winning hands may be further conditioned upon card suit or rank. For instance, the winning hand of one pair may only apply when the pair consists of a rank of jack or higher, and the winning hand of a royal flush may only apply when the five cards are all hearts.

After the player has been dealt an initial hand, the player may be offered the opportunity to replace one or more of the cards in the hand. Replacing cards in a hand may be referred to as performing a card replacement cycle, and may provide the player with a chance to improve the hand. FIG. 1 illustrates such a card replacement cycle. In FIG. 1, the player has been dealt an initial hand 112 consisting of a seven of clubs, a seven of hearts, an eight of spades, a queen of diamonds, and a five of hearts. Thus, the player has achieved a winning hand of one pair. However, as discussed previously, the return on one pair may not be significant. Therefore, in order to improve his or her hand, the player may want to replace any one or more of these cards.

FIG. 1 shows the player choosing to replace the eight of spades, queen of diamonds, and five of hearts, while holding the two sevens. Presumably, the player does this in an attempt to improve to two sevens from a one pair winning hand into a better winning hand, such as two pair, three of a kind, full house, or four of a kind. Once the player has selected the cards to be replaced, these cards may be discarded and replacement cards may be drawn from the deck.

It should be understood that is makes no difference whether a player selects the cards to be replaced or selects the cards to be held. Since any card not replaced is held and any card not held is replaced, the outcome is the same. Thus, while the following embodiments refer to the player selecting cards to be replaced, the player may actually select the cards to be held, and therefore implicitly also select the cards to be replaced.

FIG. 1 also shows the player's hand after replacement 114. In this case, the player has drawn a six of clubs, an eight of diamonds, and a nine of clubs. These cards do not improve the player's hand, as the player still has only one pair. In a traditional game of poker, the player's hand after this first card replacement cycle would be applied to a pay table, such as Table 1, and the player would be awarded, for example, a 1-to-1 return.

In such a situation, the player may be disappointed with breaking even. The player may also be caught up in the gameplay of poker, and willing to incur an additional cost for another chance to achieve a better hand. Accordingly, the house may offer the player one or more additional card replacement cycles for a cost.

II. Additional Card Replacement Cycles

Poker, as well as other types of card games, may be enhanced by optional rules providing a player with further opportunities to replace one or more cards in his or her hand. Each card replacement cycle may be associated with a cost, and the cost may be based on the relative advantage that executing the card replacement cycle may provide to the player. By offering additional card replacements, the player's interest in the card game may remain high even if the player is unsatisfied with his or her hand after the first card replacement.

Figure 2:
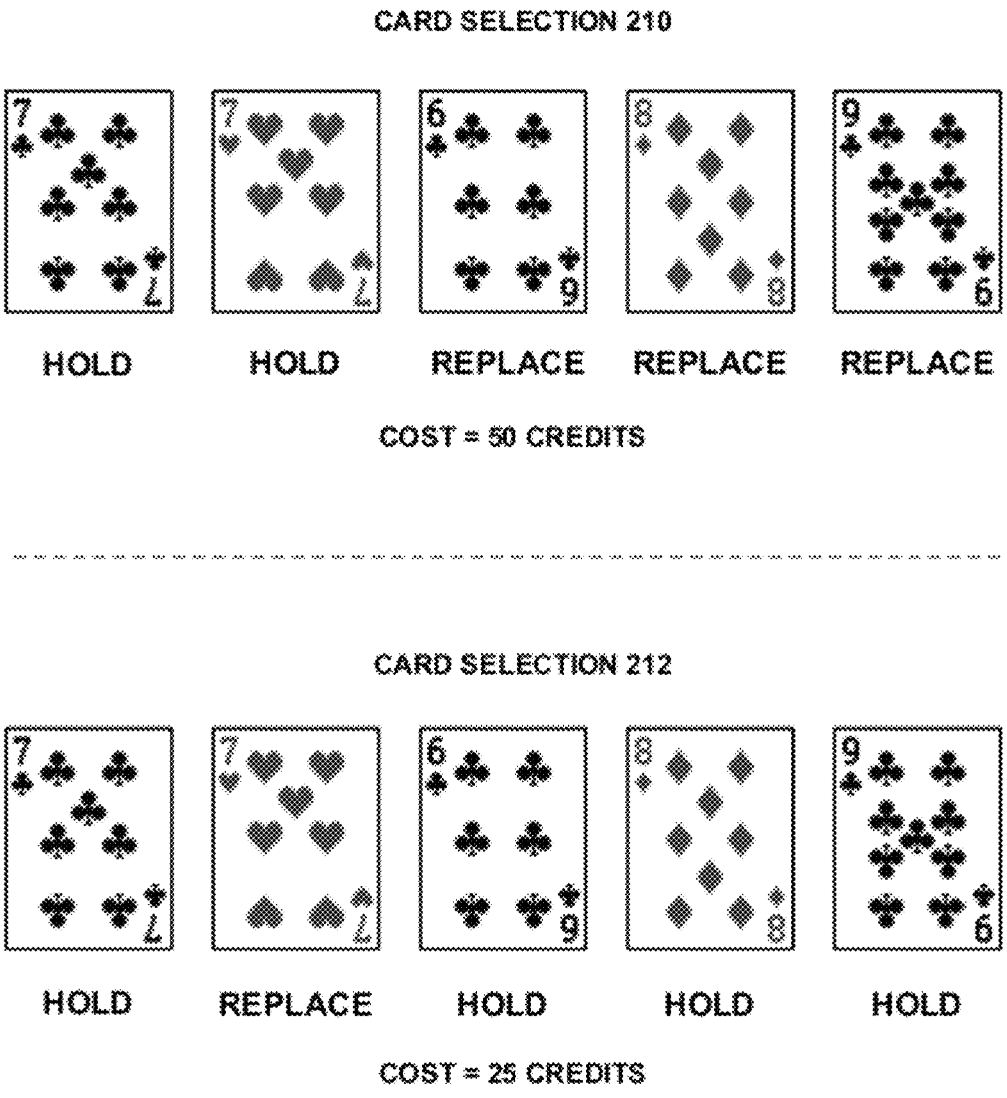
FIG. 2 illustrates potential second replacements of selected cards in a hand of poker, in accordance with an example embodiment.

FIG. 2 continues the scenario illustrated in FIG. 1. The player's hand consists of a seven of clubs, seven of hearts, six of clubs, eight of diamonds, and nine of clubs. The player selects one or more cards of these cards for a second replacement. In card selection 210, the player selects the six of clubs, eight of diamonds, and nine of clubs for replacement, thus holding the two sevens. Presumably, the player is once again attempting to improve his or her one pair into two pair, three of a kind, a full house, or four of a kind. Alternatively, in card selection 212, the player selects the seven of hearts for replacement, while holding the remaining cards. In this situation, the player is presumably attempting to achieve a straight by drawing a five or a ten as the replacement for the seven of hearts.

Preferably, the cards selected for replacement in the card selection 210 or the card selection 212 are discarded, and replacement cards are drawn from the deck. These replacement cards may be added to the player's hand, and a cost associated with the combination of selected cards may be debited from the player's account.

Once this second card replacement cycle is complete, the card game may end with the player being awarded a return based on the cards in the player's hand and a pay table such as Table 1. Alternatively, the player may be offered one or more additional card replacement cycles. Thus, the player may continue to replace the cards in his or her hand until he or she is satisfied with the result or has run out of credits. Alternatively, the player may be limited to no more than a given number of card replacement cycles per card game. Each card replacement cycle may involve the player replacing a different number of cards in his or her hand and/or incurring a different cost.

It should be understood that any cards the player discards during a card replacement cycle may be placed in a discard pile. Preferably, cards in the discard pile are not used for the remainder of the card game. After the card game has ended, all cards may be gathered, shuffled or otherwise randomized, and used as a card supply for a subsequent card game.

III. Calculating Costs

Regardless of whether the game being played is poker or another card game, each of the card selection 210 and the card selection 212 may be associated with a cost to the player. Preferably, the cost of replacing a particular set of cards is proportional to the expected gain, or a relative advantage, that replacing those cards will provide the player.

In the case of card selection 210, the player has a pair of sevens, which is a winning hand that returns 1-to-1. A pay table, such as the pay table of Table 1, that maps combinations of cards to returns may be used to determine this return. Assuming that the player wagered 100 credits on the hand, the player will receive a return of 100 credits even if the player declines to perform any additional card replacements. If the expected return associated with replacing the other three cards is 147 credits, then the expected cost to the house for performing the replacement is 147−100=47 credits. Thus, in order to break even, the house should charge the player at least 47 credits to perform the replacement, which is the difference between 100 credits and the expected return associated with replacing the other three cards. The house may add an additional house margin to this cost. For instance, the house may add a margin of 5% to the cost and charge the player 50 credits (rounded up), as shown in FIG. 2.

In the case of card selection 212, the player may relinquish his or her pair of sevens to seek a winning hand with a potentially higher return. Assuming again that the player wagered 100 credits on the hand, without replacing any cards in the hand, the player will receive a return of 100 credits. If the expected return associated with replacing the seven of hearts is 123 credits, then the expected cost to the house for performing the replacement is 123−100=23 credits. Thus, in order to break even, the house should charge the player at least 23 credits to perform the replacement, which is the difference between 100 credits and the expected return associated with replacing the other three cards. Again, the house may add an additional house margin to this cost. For example, adding a house margin of 5% to the cost will result in charging the player 25 credits (rounded up), as shown in FIG. 2.

The expected return associated with replacing a particular set of cards may be calculated in a number of ways. For instance, the expected return may be based just on the cards in the player's hand. However, the remaining cards in the deck may also be considered, as well as any cards that have already been discarded. The costs associated with any offers provided at each stage of the card game may be calculated dynamically, calculated based on statistical tables, or some combination of both.

One method of calculating an expected return associated with replacing a given set of cards in the player's hand is to calculate, based on the cards being held by the player, the cards discarded by the player, and the cards remaining in the deck, the probability of the player achieving each winning hand in the pay table. Then, each of these probabilities may be multiplied by the return associated with the respective winning hand to determine an expected return. Thus, the cost of a card replacement cycle may be dynamically calculated based on the state of the game and a pay table.

For example, consider card selection 212. The probability of the player receiving a five or a ten to replace the seven of hearts and complete the straight is 7/44. In particular, assuming a 52-card deck, five cards were dealt initially, three of which were replaced in the first card replacement cycle. Thus, there are 44 cards remaining in the card supply. There are a total of eight combined fives and tens in the deck, but one of these was discarded during the first card replacement cycle, leaving a total of seven cards that will complete the straight out of the 44 cards remaining. Of course, replacing the seven of hearts could also result in other types of winning or losing hands. The cost of the second card replacement cycle for card selection 212 may then be calculated as the difference in the player's expected returns between (a) the player's current hand, and (b) the average of all potential outcomes of replacing the seven of hearts.

In some situations, the cost of a card replacement cycle may be negative. In these situations, the house may effectively "pay" the player to replace one or more of the cards in his or her hand. For example, suppose that the player has a straight flush. If the player replaces one or more of his or her cards, the expected return of the resulting hand after this card replacement cycle may be less than the return on a straight flush. Thus, it behooves the house to attempt to convince the player to undertake the card replacement cycle.

In order to do so, the house might offer the card replacement cycle for free, or might offer the player a number of credits to perform the card replacement cycle. For instance, if performing the card replacement cycle lowers the player's expected return by 20 credits, the house might offer the player up to 20 credits to perform the card replacement cycle.

IV. Game Playing Environments

In addition to being played as table games, the embodiments of card games described herein may be facilitated through the interconnection of computers and computer networks. The advantages of computerized gameplay include allowing the player to engage in the card games from the privacy of his or her own home, or via a mobile device from virtually anywhere.

Figure 3:
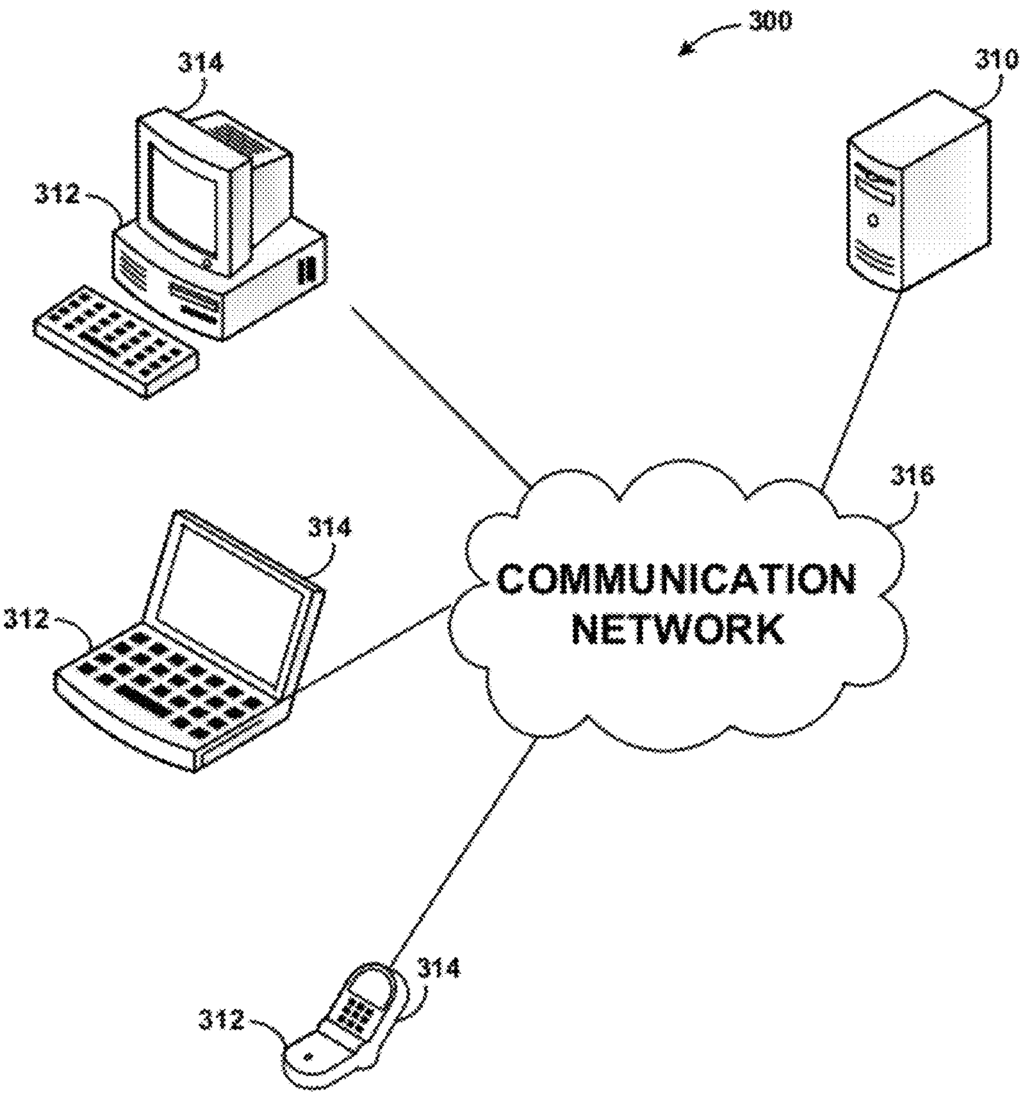
FIG. 3 is a diagram of a client/server networked computing system that may be used to facilitate card games, in accordance with an example embodiment.

FIG. 3 depicts an example of such a computerized arrangement. It should be understood, however, that this and other arrangements and processes described herein are set forth for purposes of example only, and other arrangements and elements (e.g., machines, interfaces, functions, orders of elements, etc.) can be added or used instead, and some elements may be omitted altogether. Further, as in most computer and communication architectures, those skilled in the art will appreciate that many of the elements described herein are functional entities that may be implemented as discrete components or in conjunction with other components, in any suitable combination and location. For example, systems and methods for facilitating the playing of games over a communication network are described in published PCT application WO 03/093921 A2, which is incorporated by reference herein.

In FIG. 3, the system 300 includes the gaming server 310 and the client devices 312, each preferably having a display 314. The gaming server 310, and the client devices 312 may be capable of communicating with each other by means of the communication network 316. The communication network 316 may be a public Internet Protocol (IP) network such as the Internet, a private IP network, or a public or a private network that operates according to other communication protocols. Thus, for instance, the client devices may be personal computers, laptops, or wireless communication devices such as cell phones.

Furthermore, the communication network 316 may be purpose-built or hardcoded network designed for the support of networked games. For example, the gaming server 310 may be a mainframe computer and the client devices 312 may be so-called "dumb terminals" that only communicate with the gaming server 310. Thus, the communication network 316 may only comprise communication links between the devices they connect. Alternatively, the gaming server 310 and one or more client devices 312 may be combined into a standalone gaming machine, such as a video game console.

The client devices 312 and the gaming server 310 may include various computing technologies, such as those that are semiconductor-based, magnetic, optical, acoustic, or biological in nature, any combination of these computing technologies, or any other technology known today or developed in the future, that can be used in conjunction with computational devices. A networked game architecture may also be defined to comprise more or fewer elements. For example, the gaming server 310 may be distributed across more than one physical or logical device.

A. Server Devices

The gaming server 310 may comprise a computing device with input, output, processing, storage, and memory functions. The gaming server 310 may be a form of personal computer, or may be physically designed for server operation. For example, the gaming server 310 may be a rack-mounted or blade server component. With respect to the depiction of the gaming server 310 in FIG. 1, the gaming server 310 may actually take the form of multiple physical components or computers that are co-located or distributed. For example, the gaming server 310 may be a cluster of computing devices that operate in conjunction with one another to enable networked games. This cluster may be in a particular physical location, such as an Internet service provider (ISP), or may operate over a network between multiple physical locations.

The gaming server 310 may run a standalone or distributed operating system to enable server functions. This operating system may be based on Microsoft Windows, Apple's MacOS, Linux, FreeBSD or various other technologies. These operating systems preferably support multiple processes or threads of execution so that a single gaming server 310 can support a potentially large number of networked games simultaneously. Additionally, the gaming server 310 may be provisioned with a network connection.

The gaming server 310 preferably operates under control of a server-stored program (not shown) capable of enabling the client devices 312 to participate in one or more networked games. The stored program in the gaming server 310 may also maintain a dynamic register of all participants admitted to, and actively participating in, a networked game, together with data representative of the corresponding networked game.

Additionally, the gaming server 310 may contain, or have access to, accounts associated with each of these participants. Thus, the gaming server 310 may add credits to or debit credits from these accounts in accordance with the networked game being played. Furthermore, the gaming server 310 may have an interface from which a given participant may access his or her account in order to add more credits, or to cash out the account's credit balance. Moreover, the gaming server 310 may also have an administrative interface, from which an administrator of the gaming server 310 can add, delete, or modify accounts or game settings.

B. Client Devices

The client devices 312 may comprise personal computers, computer terminals, laptop computers, wireless communication devices such as cell phones, personal digital assistants, or similar devices. Furthermore, the client devices 312 may operate under an operating system such as Microsoft Windows, Apple MacOS, Linux or FreeBSD, and are preferably provisioned with a web browser and network connection.

Using the client device 312, card games may be facilitated by a client process (not shown) that executes on the client device 312, and the server-stored program (not shown), or server process, that executes on the gaming server 310. In order to play a card game from any client device 312, a client process may first be downloaded, for example, from the gaming server 310 to the client device 312. The downloaded client process may then be installed in the client device 312, where after it is ready for execution. Alternatively, the client process may execute from within a World Wide Web browser of the client device 312. In either case, once the client process is launched, communication between the client device 312 and the gaming server 310 may then proceed.

The output functions of client devices 312 may comprise a graphical user interface (GUI) rendered on display 314. Such a GUI may represent networked game information in some combination of graphics and text. For example, a GUI on display 314 may represent the state of a card game associated with the client device 312, and include options to perform the acts of playing the card game, and, during the course of the card game, accepting or rejecting offers to redeal, replace, or discard cards. The client process executing on the client device 312 may display different trade marks, color schemes, or "look and feel" depending on the card game being played.

C. Functional Model of Gaming Servers and Client Devices

Figure 4:
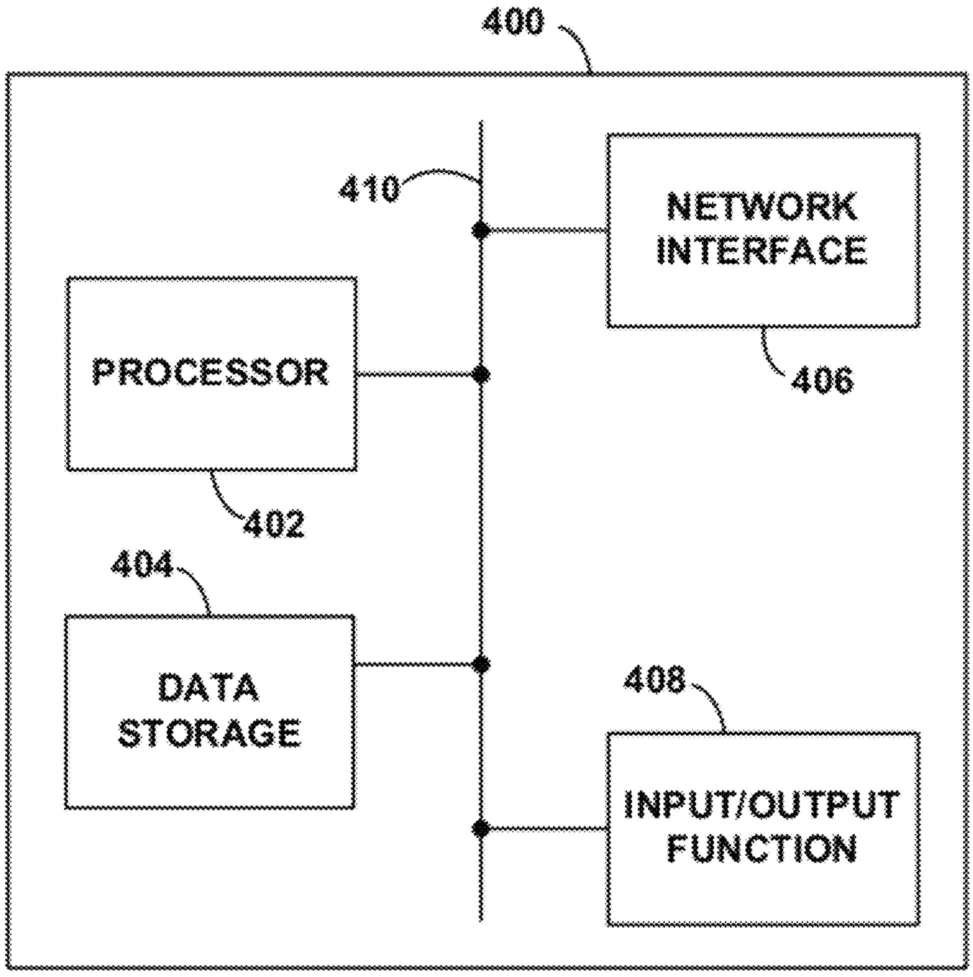
FIG. 4 is a block diagram of a computing device that may be used to execute part or all of a computerized card game, in accordance with an example embodiment.

FIG. 4 is a simplified block diagram depicting an example representation of computing device 400. Gaming servers, such as the gaming server 310, and/or client devices, such as the client devices 312, may be arranged according to such an example representation. FIG. 4 illustrates some of the functional components that would likely be found in a computing device that operates in accordance with the embodiments herein. The computing device 400 preferably includes a processor 402, data storage 404, a network interface 406, and an input/output function 408, all of which may be coupled by a system bus 410 or a similar mechanism.

The processor 402 preferably includes one or more central processing units (CPUs), such as one or more general purpose processors and/or one or more dedicated processors (e.g., application specific integrated circuits (ASICs) or digital signal processors (DSPs), etc.) The data storage 404, in turn, may comprise volatile and/or non-volatile memory and can be integrated in whole or in part with the processor 402. Alternatively, part or all of the data storage 404 may be external to computing device 400, and thus may take the form of remote storage or network storage. The data storage 404 preferably holds program instructions executable by the processor 402, and data that is manipulated by these instructions, to carry out various functions described herein. Alternatively, the functions can be defined by hardware, firmware, and/or any combination of hardware, firmware and software.

By way of example, the data in the data storage 404 may contain information associated with performing any of the methods, processes, or functions described herein or represented by any of the accompanying figures. For example, the data storage 404 may contain data associated with the state of a card game, data associated with a player's account, and so on. The data storage 404 may also contain program instructions that are executable by the processor 402 to perform any of the gaming server or client device methods, processes, or functions presented herein or represented by any of the accompanying figures.

The network interface 406 may take the form of a wireline connection, such as an Ethernet, Token Ring, SONET, or T-carrier connection. The network interface 406 may alternatively or additionally take the form of a wireless connection, such as IEEE 802.11, BLUETOOTH®, CDMA, WIMAX®, UMTS®, LTE®, or any other interface used to communicate. However, other forms of physical layer connections and other types of standard or proprietary communication protocols may be used over network interface 406. Furthermore, the network interface 406 may comprise multiple physical or logical network interfaces, each capable of operating according to the same or different protocols.

The input/output function 408 facilitates user interaction with the computing device 400. The input/output function 408 may comprise multiple types of input devices, such as a keyboard, a mouse, a touch screen, and so on. Similarly, the input/output function 408 may comprise multiple types of output devices, such as a monitor, printer, or one or more light emitting diodes (LEDs). Additionally or alternatively, computing device 400 may support remote access from another device, via the network interface 406 or via another interface (not shown), such an RS-232 port.

V. Example Methods

FIGS. 5-8 are message flow diagrams and flow charts of methods in accordance with example embodiments of this invention. Each of these figures depicts a gaming server conducting at least one card replacement cycle at the request of a client entity. All cards dealt to a player or drawn by the player in such a card game are presumed to be determined randomly from a card supply such as a standard 52-card deck. Additionally, for purposes of illustration, each of the embodiments depicted in FIGS. 5-8 describe one or two card replacement cycles. However, each of these embodiments may include further card replacement cycles that are not shown in FIGS. 5-8.

It should be understood that each of the methods illustrated by these figures may include more or fewer steps. Furthermore, the steps of any two or more of these message flow diagrams and flow charts can be combined with one another, in whole or in part, without departing from the scope of the embodiments herein. Moreover, the costs in each of the example embodiments related to FIGS. 5-8 may be determined according to any of the calculations described in Section III of this specification.

Figure 5:
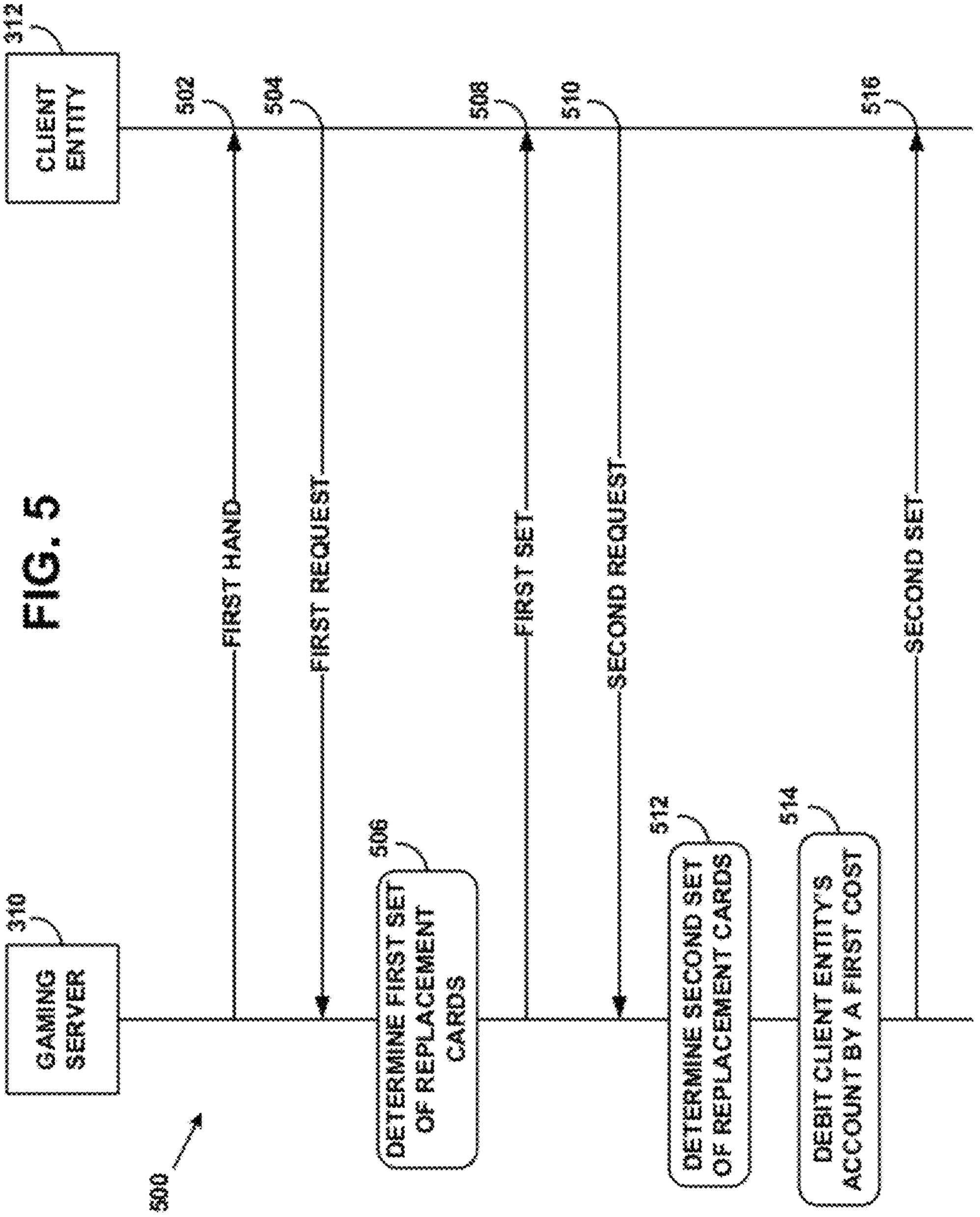
FIG. 5 is a message flow diagram, in accordance with an example embodiment.

FIG. 5 depicts a message flow 500 for facilitating a first and a second card replacement. At step 502, the gaming server 310 may provide a representation of a first hand to the client entity 312. Then, at step 504, the client entity 312 may provide a first request for card replacement to the gaming server 310. The first request may include either one or more cards to be replaced, one or more cards to be held, or both. In response to receiving this first request, at step 506 gaming server 310 may determine a first set of replacement cards, and at step 508, the gaming server 310 may provide a representation of this first set to client entity 312.

After receiving the first set of replacement cards, the client entity 312 may provide a second request for replacement cards to the gaming server 310. In response to receiving the second request, at step 512 the gaming server 310 may determine a second set of replacement cards. Additionally, at step 514, the gaming server 514 may debit the client entity's account by a first cost. The first cost may be determined at any point prior to step 514, and may be proportional to the expected gain, or a relative advantage, that replacing the chosen cards in the player's hand with the second set will provide the player. Then, at step 516, the gaming server 310 may provide a representation of the second set to the client entity 312.

Figure 6:
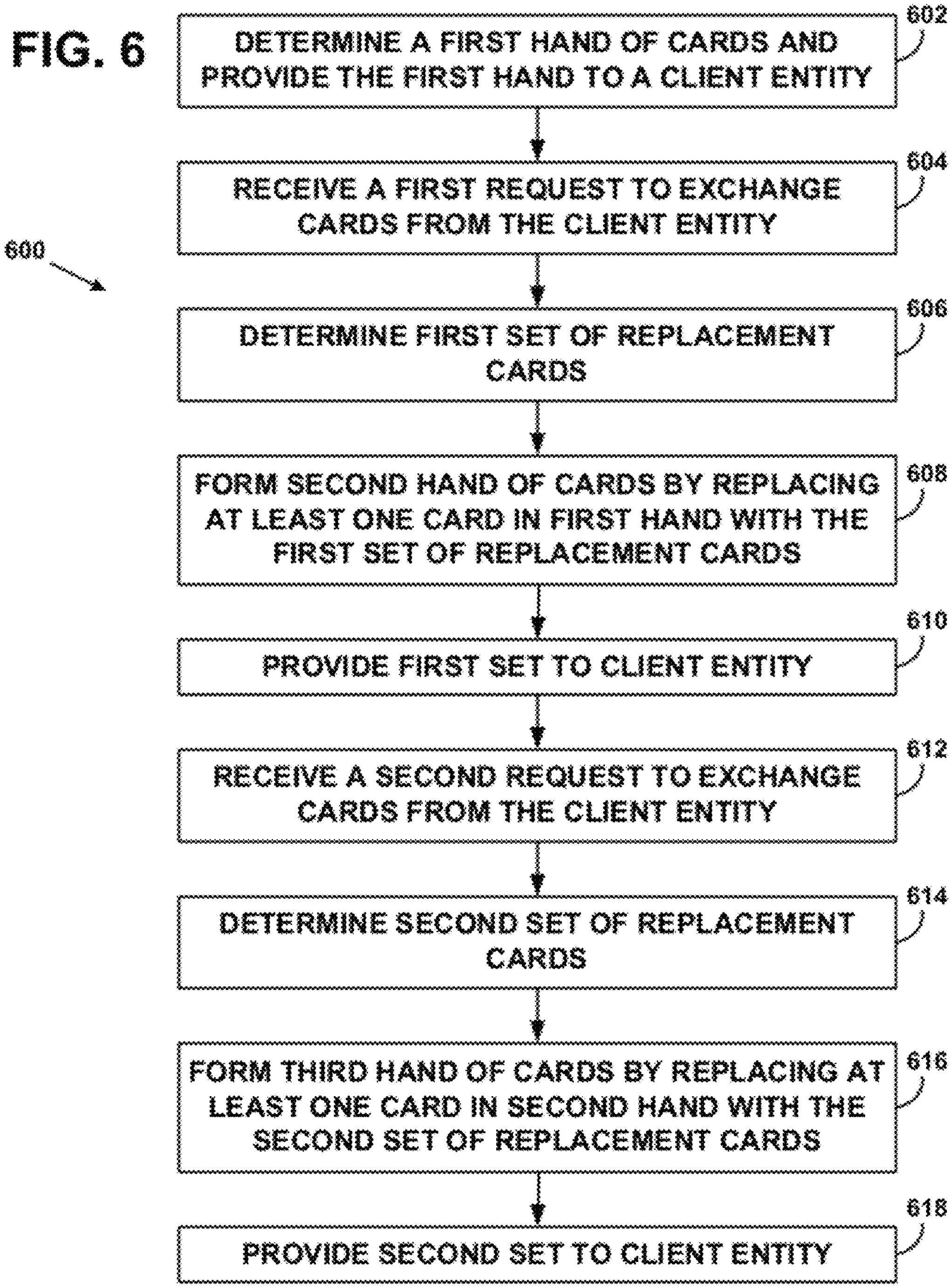
FIG. 6 is a flow chart, in accordance with an example embodiment.

FIG. 6 is a flow chart of method 600, also for facilitating replacement of one or more cards in a hand. At step 602 a first hand of cards is determined and provided to a client entity, such as client entity 312. Preferably the client entity is associated with an account. Then at step 604, a first request to exchange cards is received from the client entity. In response to receiving this first request, a first set of replacement cards are determined at step 606 and a second hand is formed at step 608. Preferably, the second hand is formed by replacing at least one card in the first hand with the first set. Then, at step 610, at least the first set is provided to the client entity.

At step 612, a second request to exchange cards is received from the client entity. In response to receiving this second request, at step 614 a second set of replacement cards may be determined, and a step 616 a third card of hands may be formed by replacing at least one card in the second hand with the second set. Then, at step 618, this second set is provided to the client entity.

Figure 7:
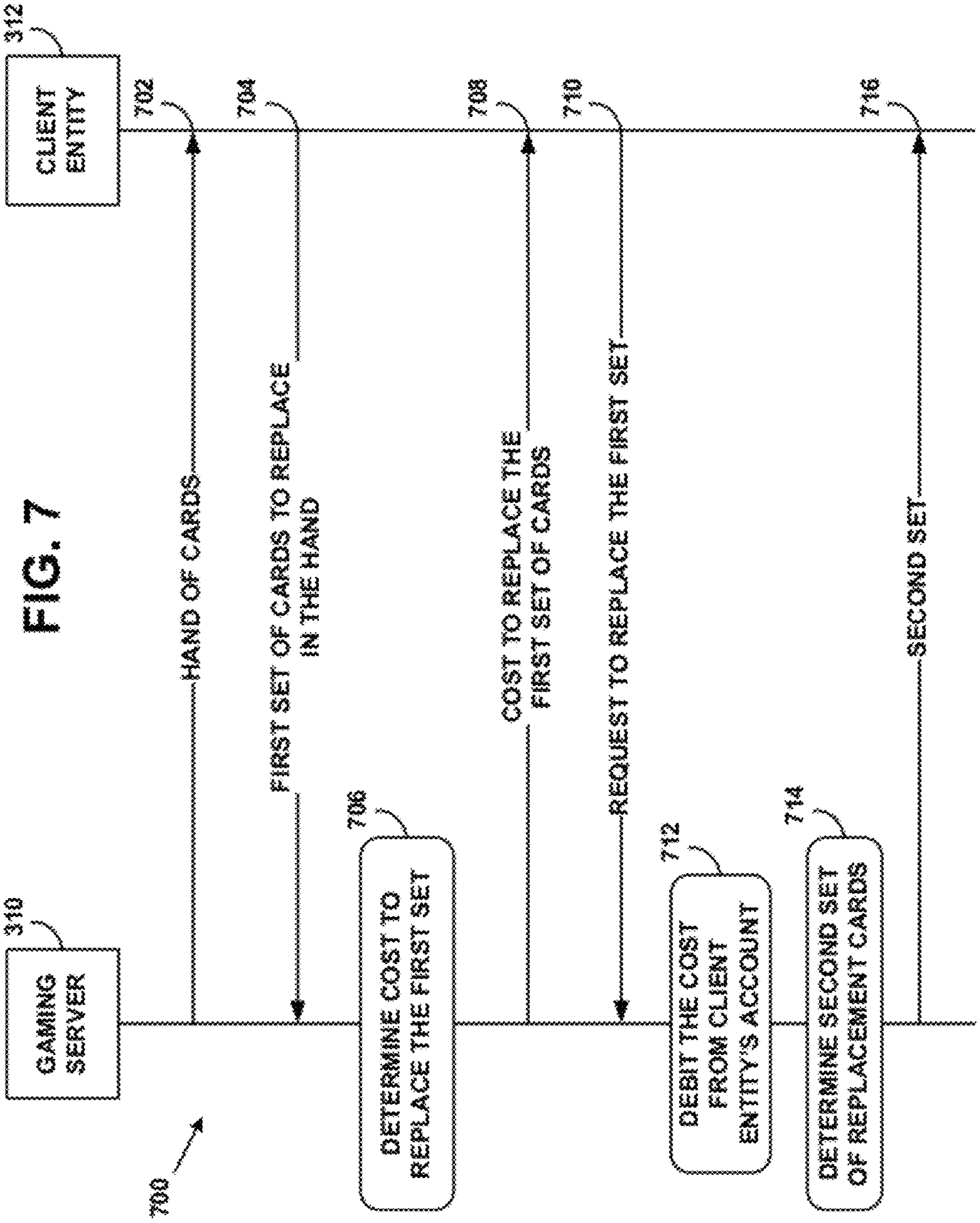
FIG. 7 is another message flow diagram, in accordance with an example embodiment.

FIG. 7 depicts a message flow 700 for facilitating card replacement. At step 702, the gaming server 310 may provide the client entity 312 with a representation of a hand of cards. The client entity 312 may then select a first set of one or more cards from the hand to replace, and at step 704 provide a representation of this first set to the gaming server 310. In response to receiving the first set, at step 706 the gaming server 310 may determine a cost to replace the first set, and at step 708 may provide a representation of this cost to the client entity 312. Preferably the cost is based on the difference between (a) the return of the hand of cards without any cards being replaced, and (b) the expected return of the hand of cards if the first set is replaced by cards chosen randomly from those remaining in the card supply.

The client entity 312 may consider whether to carry out the replacement of the first set based at least on this cost. If the client entity 312 chooses to replace the first set, at step 710 the client entity 312 may make a request to the gaming server 310 to replace the first set. In response to this request, the gaming server 310 may, at step 712, debit the cost from the account of the client entity 312, and, at step 714, determine a second set of replacement cards to replace the first set. Preferably the cards in the second set are chosen randomly from those remaining in the card supply. Then, at step 716, the gaming server 310 may provide a representation of the second set to the client entity 312.

Figure 8:
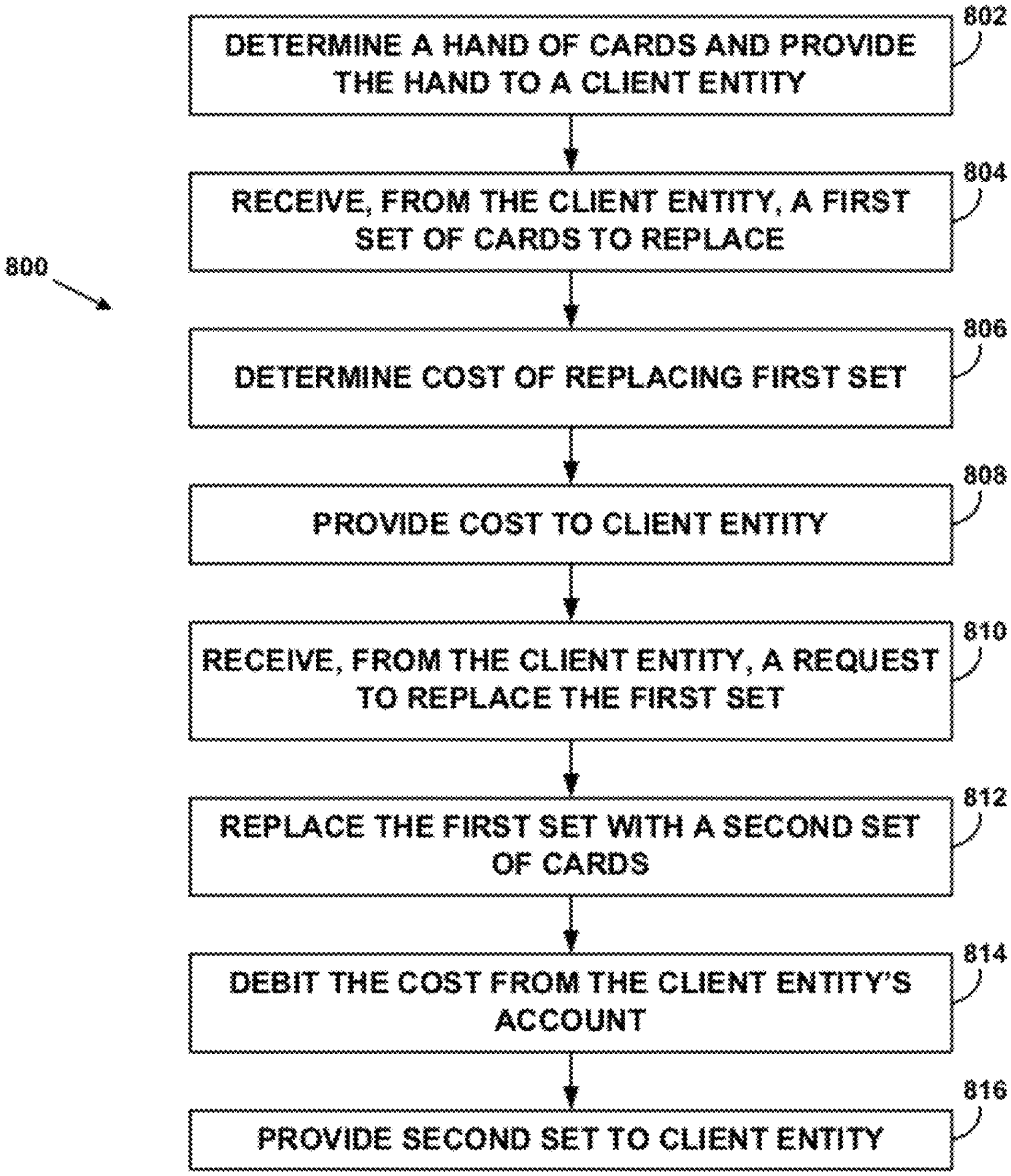
FIG. 8 is another flow chart, in accordance with an example embodiment.

FIG. 8 is a flow chart of a method 800 also for facilitating replacement of one or more cards in a hand. At step 802, a hand of cards is determined and provided to a client entity, such as client entity 312. At step 804, a first set of cards from the hand to replace is received from the client entity. At step 806, a cost for replacing the first set may be determined. Preferably the cost may be based on the difference between (a) the return of the hand of cards without any cards being replaced, and (b) the expected return of the hand of cards if the first set is replaced by cards chosen randomly from those remaining in the card supply. Then, at step 808, the cost is provided to the client entity.

At step 810, a request to replace the first set is received from the client entity. In response to receiving this request, at step 812 the first set of cards may be replaced by a second set of cards. Preferably the cards in the second set are chosen randomly from those remaining in the card supply. At step 814 the cost may be debited from the client entity's account, and at step 816, the second set may be provided to the client entity.

It should be understood that client entity 312 may be physically or logically distinct from the gaming server 310. Thus, client entity 312 may be a client machine that is communicatively linked to the gaming server 310 by a network. In this case, the gaming server providing information (e.g., representations of cards and/or representations of costs) to the client entity 312 may comprise the gaming server 310 transmitting the information through the network.

Alternatively, the client entity 312 may be physically or logically combined with the gaming server 310. Thus, the client entity 312 may be a user interface that is coupled to the gaming server 310, and the gaming server 310 providing information to the client entity 312 may comprise displaying the information on the user interface.

V. Conclusion

For the embodiments described herein, the terms "random" or "randomly" shall refer to any realizable process of randomly generating events. Such processes shall include, but not be limited to, generating events without a deterministic pattern of occurrences. Additionally, these processes may be pseudo-random, thus resulting in a deterministic pattern of occurrences that exhibit some form of statistical randomness.

It should also be understood that use of any form of enumeration within an element of any of the claims should not be construed to imply that an ordering of events within the claim is required.

Furthermore, other variations from the disclosed embodiments may be made without departure from the scope of the invention. All questions concerning scope are to be answered by reference to the appended claims.

I claim:

1. A method for a gaming server to conduct a card game comprising:

the gaming server determining a first hand of cards and providing the first hand to a client entity, wherein the client entity is associated with an account;

in response to receiving a first request from the client entity, the gaming server (i) determining a first set of replacement cards to replace one or more cards in the first hand, thereby forming a second hand of cards, and (ii) providing at least the first set to the client entity; and in response to receiving a second request from the client entity, the gaming server (i) calculating and providing, to the client entity, a first cost associated with replacing one or more cards in the second hand of cards, wherein the first cost is based on (a) a particular expected gain, to the client entity, of replacing the one or more cards, and (b) particular cards held in the second hand of cards, (ii) determining a second set of replacement cards to replace the one or more cards in the second hand of cards, thereby forming a third hand of cards, (iii) debiting the account by the first cost, and (iv) providing at least the second set to the client entity.

2. The method of claim 1, further comprising:

in response to receiving a third request from the client entity, the gaming server (i) determining a third set of replacement cards to replace one or more cards in the third hand of cards, thereby forming a fourth hand of cards, (ii) debiting the account by a second cost associated with replacing the one or more cards in the third hand, and (iii) providing at least the third set to the client entity.

3. The method of claim 2, wherein the first cost is not equal to the second cost.

4. The method of claim 1, wherein the client entity is a client machine that is communicatively linked to the gaming server by a network, and wherein providing the first hand, the second hand, and the third hand to the client entity comprises the gaming server transmitting representations of the first hand, the second hand, and the third hand through the network.

5. The method of claim 1, wherein the client entity is a user interface, and wherein providing the first hand, the second hand, and the third hand to the client entity comprises the gaming server displaying representations of the first hand, the second hand, and the third hand on the user interface.

6. The method of claim 1, wherein the card game is poker, and each of the first hand, the second hand, and the third hand comprises at least five cards.

7. The method of claim 1, wherein determining the first hand, the first set, and the second set comprises drawing the first hand, the first set, and the second set from a deck of cards.

8. The method of claim 7, wherein the deck is a standard 52-card deck.

9. The method of claim 1, wherein the first set and the second set are of different sizes.

10. The method of claim 1, wherein the particular expected gain is based on a relative advantage, to the client entity, of replacing the one or more cards in the second hand.

11. The method of claim 1, wherein the particular expected gain is based on a difference between a first return associated with continuing the card game without replacing the one or more cards in the second hand, and an expected second return associated with continuing the card game with the second set replacing the one or more cards in the second hand.

12. The method of claim 1, wherein the particular expected gain is based at least on the one or more cards in the second hand.

13. The method of claim 12, wherein the particular expected gain is also based on the one or more cards in the first hand that are replaced.

14. The method of claim 1, wherein the second request specifies the one or more cards in the second hand, and wherein the particular expected gain is calculated based on the one or more cards in the second hand.

15. The method of claim 1, wherein the first cost is negative.

16. A method for a gaming server to conduct a card game, the method comprising:

the gaming server providing a first hand of cards to a client entity, wherein the client entity is associated with an account;

in response to receiving, from the client entity, a first set of cards in the first hand, the gaming server calculating a first cost associated with replacing the first set and providing the first cost to the client entity, wherein the first cost is based on (a) a particular expected gain, to the client entity, of replacing the first set, and (b) particular cards held in the first hand; and in response to receiving a first request to replace the first set from the client entity, the gaming server (i) replacing the first set with a second set of cards, thereby forming a second hand of cards, (ii) debiting the first cost from the account, and (iii) providing at least the second set to the client entity.

17. The method of claim 16, wherein the first hand of cards is associated with a first return, wherein replacing the first set of cards is associated with an expected second return, and wherein the particular expected gain is based on a difference between the expected second return and the first return.

18. The method of claim 17, wherein the gaming server maintains a pay table that maps combinations of cards to returns, and wherein the first return is based on applying the first hand to the pay table.

19. The method of claim 17, wherein each possible respective second hand of cards is associated with a respective probability, and wherein determining the expected second return further comprises the gaming server applying each possible respective second hand to the pay table to determine a respective return, and weighing each respective return by the respective probability associated with the possible respective second hand.

20. The method of claim 17, wherein the card game includes a card supply and a discard pile, and wherein the expected second return is based at least in part on cards in the card supply and cards in the discard pile.

21. The method of claim 17, wherein the first hand and the second set are drawn from a deck of cards, wherein the expected second return is based on the first hand, the second set, and cards remaining in the deck.

22. The method of claim 16, wherein the client entity is a client machine that is communicatively linked to the gaming server by a network, and wherein providing the first hand, the first cost, and the second set to the client entity comprises the gaming server transmitting representations of the first hand, the first cost, and the second set through the network.

23. The method of claim 16, wherein the client entity is a user interface, and wherein providing the first hand, the first cost, and the second set to the client entity comprises the gaming server displaying representations of the first hand, the first cost, and the second set on the user interface.

24. The method of claim 16, the method further comprising:

in response to receiving, from the client entity, a third set of cards in the second hand, the gaming server (i) calculating a second cost associated with replacing the third set, and (ii) providing the second cost to the client entity; and in response to receiving, from the client entity, a second request to replace the third set, the gaming server (i) replacing the third set with a fourth set of replacement cards, thereby forming a third hand of cards, (ii) debiting the second cost from the account, and (iii) providing at least the fourth set to the client entity.

25. A gaming server for conducting a card game, the gaming server comprising:

a processor;

an interface for communicating with a client entity, wherein the client entity is associated with an account; and a data storage containing program instructions executable by the processor to:

determine a first hand of cards and provide the first hand to a client entity, in response to receiving a first request from the client entity, (i) determine a first set of replacement cards to replace one or more cards in the first hand, thereby forming a second hand of cards, and (ii) provide at least the first set to the client entity, and in response to receiving a second request from the client entity, (i) calculate and provide, to the client entity, a first cost associated with replacing one or more cards in the second hand of cards, wherein the first cost is based on (a) a particular expected gain, to the client entity, of replacing the one or more cards, and (b) particular cards held in the second hand of cards, (ii) determine a second set of replacement cards to the replace one or more cards in the second hand of cards, thereby forming a third hand of cards, (iii) debit the account by the first cost, and (iv) provide at least the second set to the client entity.

26. The gaming server of claim 25, further comprising:

program instructions, contained in the data storage and executable by the processor, to in response to receiving a third request from the client entity, (i) determine a third set of replacement cards to replace one or more cards in the third hand of cards, thereby forming a fourth hand of cards, (ii) debit the account by a second cost associated with replacing the one or more cards in the third hand, and (iii) provide at least the third set to the client entity.

27. The gaming server of claim 26, wherein the first cost is not equal to the second cost.

28. The gaming server of claim 25, wherein the client entity is a client machine communicatively linked to the gaming server by a network, and wherein providing the first hand, the second hand, and the third hand to the client entity comprises the gaming server transmitting representations of the first hand, the second hand, and the third hand via through the network via the interface.

29. The gaming server of claim 25, wherein the client entity is a user interface, and wherein providing the first hand, the second hand, and the third hand to the client entity comprises the gaming server displaying representations of the first hand, the second hand, and the third hand on the user interface.

30. The gaming server of claim 25, wherein the card game is poker, and each of the first hand, the second hand, and the third hand comprises at least five cards.

31. The gaming server of claim 25, wherein determining the first hand, the first set, and the second set comprises drawing the first hand, the first set, and the second set from a deck of cards.

32. The gaming server of claim 31, wherein the deck is a standard 52-card deck.

33. The gaming server of claim 25, wherein the first set and the second set are of different sizes.

34. The gaming server of claim 25, wherein the particular expected gain is based on a relative advantage, to the client entity, of replacing the one or more cards in the second hand.

35. The gaming server of claim 25, wherein the particular expected gain is based on a difference between a first return associated with continuing the card game without replacing the one or more cards in the second hand, and an expected second return associated with continuing the card game with the second set replacing the one or more cards in the second hand.

36. The gaming server of claim 25, wherein the particular expected gain is based at least on the one or more cards in the second hand.

37. The gaming server of claim 36, wherein the particular expected gain is also based on the one or more cards in the first hand that are replaced.

38. The gaming server of claim 25, wherein the second request specifies the one or more cards in the second hand, and wherein the particular expected gain is calculated based on the one or more cards in the second hand.

39. The gaming server of claim 25, wherein the first cost is negative.

40. A gaming server for conducting a card game, the gaming server comprising:

a processor;

an interface for communicating with a client entity, wherein the client entity is associated with an account; and a data storage containing program instructions executable by the processor to:

provide a first hand of cards to the client entity, in response to receiving, from the client entity, a first set of cards in the first hand, calculate a first cost associated with replacing the first set and provide the first cost to the client entity, wherein the first cost is based on (i) a particular expected gain, to the client entity, of replacing the first set, and (ii) particular cards held in the first hand, and in response to receiving a first request to replace the first set from the client entity, (i) replace the first set with a second set of cards, thereby forming a second hand of cards, (ii) debit the first cost from the account, and (iii) provide at least the second set to the client entity.

41. The gaming server of claim 40, wherein the first hand of cards is associated with a first return, wherein replacing the first set of cards is associated with an expected second return, and wherein the particular expected gain is based on a difference between the expected second return and the first return.

42. The gaming server of claim 41, wherein the gaming server maintains a pay table that maps combinations of cards to returns, and wherein the first return is based on applying the first hand to the pay table.

43. The gaming server of claim 41, wherein each possible respective second hand of cards is associated with a respective probability, and wherein determining the expected second return comprises applying each possible respective second hand to the pay table to determine a respective return, and weighing each respective return by the respective probability associated with the possible respective second hand.

44. The gaming server of claim 41, wherein the card game includes a card supply and a discard pile, and wherein the expected second return is based at least in part on cards in the card supply and cards in the discard pile.

45. The gaming server of claim 41, wherein the first hand and the second set are drawn from a deck of cards, wherein the expected second return is based on the first hand, the second set, and cards remaining in the deck.

46. The gaming server of claim 40, wherein the client entity is a client machine that is communicatively linked to the gaming server by a network, and wherein providing the first hand, the first cost, and the second set to the client entity comprises transmitting representations of the first hand, the first cost, and the second set through the network.

47. The gaming server of claim 40, wherein the client entity is a user interface, and wherein providing the first hand, the first cost, and the second set to the client entity comprises displaying representations of the first hand, the first cost, and the second set on the user interface.

48. The gaming server of claim 40, further comprising:

program instructions contained in the data storage and executable by the processor to (i) in response to receiving, from the client entity, a third set of cards in the second hand, (a) calculate a second cost associated with replacing the third set, and (b) provide the second cost to the client entity, and (ii) in response to receiving, from the client entity, a second request to replace the third set (a) replace the third set with a fourth set of replacement cards, thereby forming a third hand of cards, (b) debit the second cost from the account, and (c) provide at least the fourth set to the client entity.

49. A non-transitory computer readable medium for use in a gaming server, the medium containing program instructions, executable by a processor in the gaming server, for performing the steps of:

determining a first hand of cards and providing the first hand to a client entity, wherein the client entity is associated with an account;

in response to receiving a first request from the client entity, (i) determining a first set of replacement cards to replace one or more cards in the first hand, thereby forming a second hand of cards, and (ii) providing at least the first set to the client entity; and in response to receiving a second request from the client entity, the gaming server (i) calculating and providing, to the client entity, a first cost associated with replacing one or more cards in the second hand of cards, wherein the first cost is based on (a) a particular expected gain, to the client entity, of replacing the one or more cards, and (b) particular cards held in the second hand of cards, (ii) determining a second set of replacement cards to replace the one or more cards in the second hand of cards, thereby forming a third hand of cards, (iii) debiting the account by the first cost, and (iv) providing at least the second set to the client entity.

* * * * *